May 18, 1926.

J. B. FOOTE

DRIVING MECHANISM FOR TRACTORS

Original Filed Oct. 4, 1919

1,585,141

Witness:
John Enders

Inventor:
John B. Foote
by Fred Gerlach
his Atty.

Patented May 18, 1926.                                                1,585,141

UNITED STATES PATENT OFFICE.

JOHN B. FOOTE, OF OAK PARK, ILLINOIS; JOHN T. KERWIN ADMINISTRATOR OF SAID JOHN B. FOOTE, DECEASED.

DRIVING MECHANISM FOR TRACTORS.

Original application filed October 4, 1919, Serial No. 328,487. Divided and this application filed April 5, 1921. Serial No. 458,827.

The invention relates to driving mechanism for tractors, and its object is to provide an improved construction in which reducing gearing is disposed between the inner ends of the axles of the traction wheels and the differential gearing.

This application is a division of Serial No. 328,487 filed by me October 4, 1919.

The invention consists in the several novel features hereinafter set forth and more particularly defined by claims at the conclusion hereof.

Figure 1:
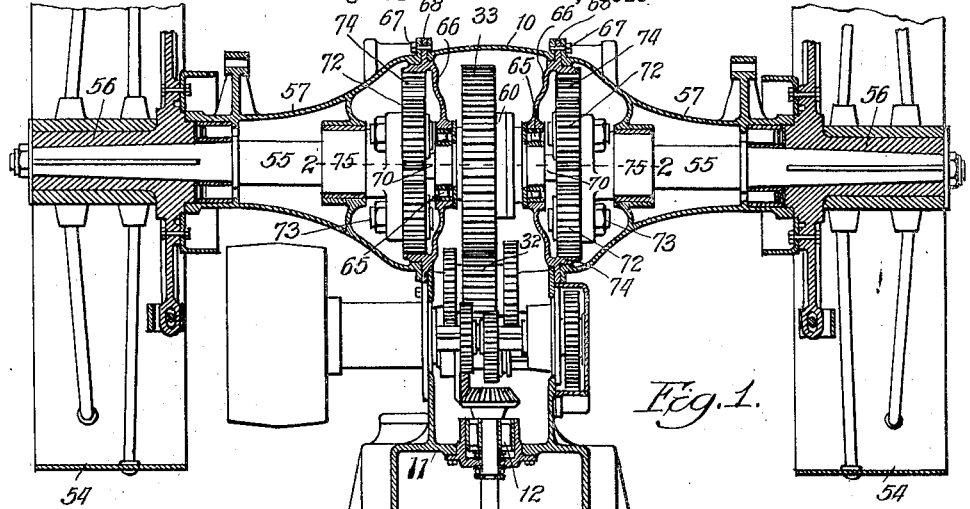
Figure 2:
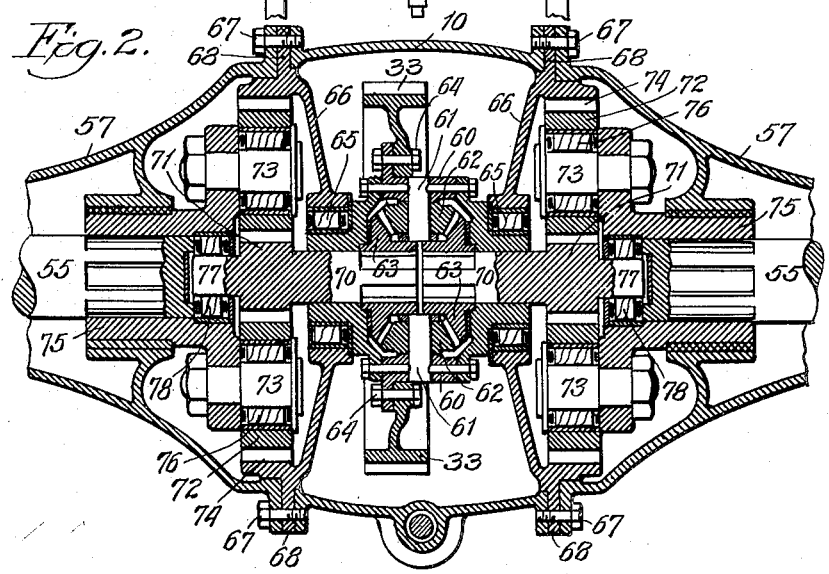
Figure 3:
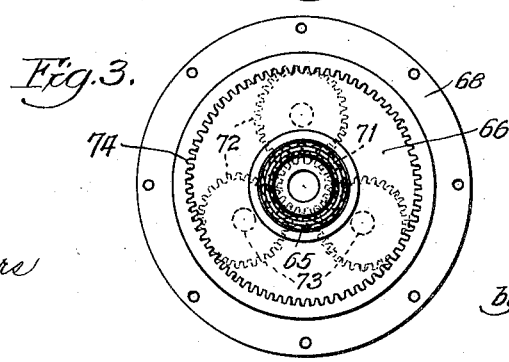

In the drawings: Fig. 1 is a plan of mechanism embodying the invention, parts being shown in section. Fig. 2 is a transverse section taken on line 2—2 of Fig. 1. Fig. 3 is a face view of one of the removable bearing supports for the differential.

The variable speed gearing is enclosed in a case 10 which is adapted to contain lubricant and serves as an enclosure and a support therefor. The front portion of the case 10 is provided with a wall 11 containing a bearing 12 for a longitudinal shaft 13 which is driven from the usual motor (not shown). The variable speed transmission gearing may be of the construction set forth in the aforesaid application No. 328,487, and for a more detailed description thereof reference may be had to said application. The variable speed and reversible transmission gearing comprises a gear 32 which meshes constantly with a gear ring 33 on the differential, and power will be transmitted to said gear ring in different speeds and in reverse direction to said gear 32.

The tractor operated by the driving mechanism comprises traction wheels 54—54, an axle composed of members 55—55, hubs 56 keyed on the ends of the outer axle members respectively and connected to drive the traction wheels, and sleeves 57—57 between the sides of the case 10 and said hubs.

The differential gearing comprises a drum 60 to which ring gear 33 is secured by bolts 64, radial arbors 61 mounted in the drum, pinions 62 on said arbors and bevel gear 63 meshing with said pinions. The hub of each gear 63 is mounted in the hubs of drum 60. Said hub are each journalled in a bearing 65 which is carried by a head 66 which is removably secured in an opening by bolts 67 to and held in an opening formed in one side of the case 10. The openings in which the heads 66 are are of sufficient diameter to permit lateral insertion and removal of the differential gearing including the gear ring 33. These heads 66 have flanges 68 which are clamped between the sleeve 57 and the case 10. Stub-shafts 70 are secured in and driven by the gears 63, and respectively extend thru the sides of the drum 60, and each has a pinion 71 at its outer end to drive a planetary reducing gearing between the differential gearing and one of the axle members. Each reducing gearing comprises a series of planetary pinions 72 journalled on bearings 76 which are carried by studs 73 respectively, meshing with a pinion 71 and an internal gear 74 formed on one of the heads 66. Studs 73 are secured to a hub 75 which rotates in a bearing adjacent the inner end of one sleeve 57 and is secured on the inner end of and drives one axle member 55. Studs 77 provided on the outer ends of pinion 71 are sustained in bearings 78 which are carried in the hubs 75. When bolts 67 are removed, the sleeve 57 and axle members can be removed, the latter being removable from hubs 75, leaving the reducing gearing in the heads 66. When the sleeves have been removed, these heads and the reducing gearing can be removed. When one of the heads 66 is removed, the differential gearing including ring gear 33 may be removed laterally from the case and likewise inserted.

The invention exemplifies a combined differential and reducing gearing in which the casing is provided with openings for the lateral insertion and removal of the differential gearing and heads in which the bearings for the differential gearing are sustained, the heads being adapted to be placed in position independently of the sleeves.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In driving mechanism for tractors, the combination of a gear case, differential gearing in the case, axle members, the case having openings in its sides thru which the differential gearing may be inserted or removed, heads adjacent to said openings, bolts extending thru said heads and the case for securing the heads to the case, reducing gearing between the differential gearing and said members, and bearings for the differential carried by said heads.

2. In driving mechanism for tractors, the combination of a gear case, differential gearing in the case, axle members, the case having openings in its sides thru which the differential gearing may be inserted or removed, heads adjacent to said openings, bolts extending thru said heads and the case for securing the heads to the case, sleeves separable from the heads and secured to the case, bearings for the differential carried by said heads, and reducing gearing between the differential and said members respectively.

3. In driving mechanism for tractors the combination of a gear case, differential gearing in the case, the latter having openings in its sides thru which the differential gearing may be inserted or removed, heads adjacent to said openings and provided with flanges, sleeves, bolts extending thru said sleeves and flanges to secure the sleeves and heads to the case, axle members in the sleeves and reducing gearing between the differential and said members.

JOHN B. FOOTE.